United States Patent [19]
Jammet Jean C.

[11] Patent Number: 5,262,481
[45] Date of Patent: Nov. 16, 1993

[54] MOISTURE-CROSS-LINKABLE THERMOPLASTIC ADHESIVE COMPOSITIONS, USES THEREOF, AND MODIFIED COMPONENTS FOR USE IN SAID ADHESIVE COMPOSITIONS

[75] Inventor: Jammet Jean C., Glisolles, France

[73] Assignee: CECA, S.A., France

[21] Appl. No.: 725,049

[22] Filed: Jul. 3, 1991

[30] Foreign Application Priority Data

Jul. 5, 1990 [FR] France ............... 90 08532

[51] Int. Cl.$^5$ .............. C08L 31/04; C08L 75/08; C08L 91/06
[52] U.S. Cl. .................. 525/125; 525/123; 525/127; 525/457
[58] Field of Search .......... 525/123, 125, 127, 457

[56] References Cited

U.S. PATENT DOCUMENTS

| | | | |
|---|---|---|---|
| 3,463,753 | 8/1969 | Gonzenbach et al. | 524/187 |
| 3,718,712 | 2/1973 | Tushaw | 525/457 |
| 4,320,211 | 3/1982 | Acharya et al. | 525/210 |
| 4,325,853 | 4/1982 | Acharya et al. | 525/330.3 |
| 4,337,297 | 6/1982 | Karim et al. | 525/125 |
| 4,377,510 | 3/1983 | Ruckel et al. | 524/187 |
| 4,471,106 | 9/1984 | Luecke et al. | 528/205 |
| 4,808,255 | 2/1989 | Markevka et al. | 525/127 |
| 4,855,382 | 8/1989 | Vanhaeren | 528/45 |
| 4,908,408 | 3/1990 | Boutillier et al. | 525/124 |

FOREIGN PATENT DOCUMENTS

A10380379 1/1990 European Pat. Off. .

OTHER PUBLICATIONS

Chem Abstracts vol. 97, 1982.
Chem Abstracts vol. 107, 1987.

Primary Examiner—James J. Seidleck
Assistant Examiner—Thomas Hamilton, III

[57] ABSTRACT

Monocomponent thermoplastic adhesives that are spontaneously cross-linkable by moisture and modified tackifier resins and other modified components for use therein that are obtained by reacting the same with an excess of polyisocyanate, and more specifically with MDI. The thermoplastic adhesives formulated with these modified resins have good resistance to creep at temperatures as high as 160° C.

6 Claims, No Drawings

MOISTURE-CROSS-LINKABLE THERMOPLASTIC ADHESIVE COMPOSITIONS, USES THEREOF, AND MODIFIED COMPONENTS FOR USE IN SAID ADHESIVE COMPOSITIONS

BACKGROUND OF THE INVENTION

The present invention pertains to new improved components for thermoplastic adhesives intended to cross-link slowly after application.

Thermoplastic adhesives are compositions intended to assure the bond between diverse materials. These adhesives are in the form of solid, stiff compositions at room temperature, but they melt when the temperature is raised and then develop adhesive properties in their melted state and continue to adhere strongly to the supports on which they were deposited upon returning to the solid state.

Generally, thermoplastic adhesives are compositions based on a thermoplastic polymer, e.g., EVA (ethylene-vinyl acetate copolymer), APAO (atactic poly α-olefin) and thermoplastic rubber, and which also contain, depending on the case:

(i) tackifier resin, a substance which is defined by its own specific physical and chemical properties, notably its compatibility in the hot state with polymer bases, and by the thermomechanical properties that it induces in the polymer mixtures in which it is contained, i.e., an improvement in their wettability and fluidity, an increase in their glass transition temperature $T_g$ and a reduction in their modulus;

(ii) plasticizers, substances that have the role of reducing the glass transition temperature $T_g$ and of making the mixture more pliable;

(iii) waxes and/or paraffins, which act as simple charges in the solidified material, which can accentuate the elastic performance and improve the mechanical performance, and as solvents in the melted product, which decrease the viscosity;

(iv) oils, which decrease the viscosity and improve the pliability at room temperature; and/or (v) mineral charges, fillers (chalk), or pigments (titanium oxide).

Thermoplastic adhesives are extensively employed in industry, e.g., in packaging, furniture, labeling, binding and plumbing, where they are appreciated for their moderate price, ease of use, quick setting, lack of solvent and, generally, their low toxicity. Nevertheless, they have two major defects. On the one hand, their mechanical resistance is low and, on the other hand, their heat performance is very limited. These defects restrict their use to nonstructural bonding, i.e., to the bonding of materials that themselves have low mechanical resistance, such as paper, thin plastic films, cardboard and non-woven materials. Their mediocre heat performance is the corollary of their thermoplasticity, and originates in their composition itself, based on thermoplastic polymers such as ethylene/vinyl acetate copolymers, thermoplastic rubbers and atactic propylene, and limits their use to a temperature range of circa −30° C. to +60° C.

Bonding with a thermoplastic adhesive is carried out by depositing the hot (circa 160° C.) product which has low viscosity (viscosity between circa 0.1 and 100 Pa.s) on the support, then almost immediate counterbonding with the second support. Setting is effected by simple cooling, by passage through a phase transition: crystallization and/or glass transition. This system is perfectly reversible and if the adhesive is reheated, it remelts. But even before remelting, it loses some of its strength which is manifested by a tendency to creep, which can result in the relative displacement of the bonded pieces or even their total detachment. This drawback can even be manifested with certain very pliable adhesives at room temperature.

For several years, chemists have explored many approaches in attempts to resolve this defect. These approaches can be grouped into bicomponent products and monocomponent products. The term "bicomponent" means a formulation which is necessarily presented in the form of two products that must be mixed together at the moment of use, because the mixture itself is reactive and its properties develop as soon as the mixture is created. As its name indicates, a "monocomponent" product is comprised of a single product which is stable when stored, at least for a reasonable period of time. The bicomponent product approach, notably based on epoxides, is difficult and implementation is delicate. The monocomponent approach is more fertile with monocomponents with high melting points or monocomponents that can be cross-linked by heat, by the oxygen in the air, by irradiation (UV, electron jet, etc.), by the moisture in the air or the supports to be bonded.

Improvement in heat performance by selecting thermoplastic components with high crystallization temperatures has given birth to thermoplastic adhesives based on polyamides and polyesters. These products, which remain expensive, have the drawback that they can only be applied at high temperatures and therefore undergo noteworthy thermal degradation and, in addition, the bonding quality is mediocre under ordinary application conditions, probably because the crystallization of these products takes places too quickly and is associated with poor wetting.

Chemical cross-linking can be created with heat, rather like the cross-linking of rubber by means of vulcanization. The chemical process of this process is extremely variable. A peroxide path is known with monomers and/or copolymers with potentially reactive residual double bonds, e.g., acrylic copolymers, or the urethane-acrylates from the Basenden Company. The product, which has a phase transition at circa 40°–80° C., is applied at circa 60°–100° C. and cross-linked at high temperature (circa 180° C. for 10 minutes). Another approach that has been followed is that of polycondensation of EVA-type polymers modified by an hydroxyacrylate, which are cross-linked at circa 180° C. for 10 minutes with a blocked isocyanate. Cf. the French patent application published as No. FR 2,616,155 (ATOCHEM) and European Patent Application No. 0 302 620 (EXXON CHEMICAL). These approaches are restrictive. They impose a high-temperature curing step, contrary to most applications. In addition, these products can begin the cross-linking process as they are applied, which creates the risk of damaging the application equipment.

The formulations based on chemical cross-linking using the oxygen from the air use alkyl boranes. They are more experimental than industrial in nature.

UV irradiation cross-linking was proposed by Dynamit Nobel with polyesters that are sensitive to UV radiation, which can be applied around 50° C. SHELL employs the same principle with its KRATON 1320 X. This aproach is only applicable to the cross-linking of thin layers of product and its application is very specific (e.g., use for coating products).

Cross-linking using moisture has been exploited for many years by adhesives based on polyurethane-polyols with a low melting point, i.e., a $T_m$ between 30 and 50° C. and/or with a high glass transition temperature, i.e., a $T_{g-}40°$ C. and $+35°$ C. (cf. notably European Patent No. 0 107 097, FULLER). This approach is also implemented with silicone mastics and thermoplastic adhesives based on EVA grated with a silanol (cf., notably British Patent No. 2 197 326, SWIFT). For these latter products, the hot stability is very mediocre and there is a very intense increase in the viscosity when the product remains exposed for more than three hours at circa 150° C. This is obviously a major constraint in the manufacture and use of thermoplastic adhesives.

There have also been proposed adhesives based on EVA/liquid polyurethane prepolymers/tackifier resin mixtures in which the PPU prepolymer (the abbreviated term "PPU prepolymer" is used to designate the polyurethane prepolymers) is a conventional elastomer base that is almost liquid at room temperature and has excess free —NCO groups that make it cross-linkable with water. The PPU prepolymers are obtained in a known manner by reaction of an excess of polyisocyanate monomer with polyol monomers.

Studies have shown that in order to obtain proper cross-linking, the level of PPU prepolymer in the formulation must reach circa 30% by weight. The product is then highly softened and its cohesion at room temperature is considerably below that of a conventional thermoplastic adhesive as long as cross-linking has not been performed, which requires circa 24 hours.

SUMMARY OF THE INVENTION

It has now been discovered that it is possible to endow certain conventional bases in the formulations of thermoplastic adhesives with the property of reacting with moisture, i.e., the tackifier resins, but also certain waxes, oils and plasticizers, by reaction with bifunctional or multifunctional isocyanates, and to exploit these modified components for the formulation of monocomponent thermoplastic adhesives that are post-cross-linkable by moisture and useful for the creation of adhesives that resist creep at temperatures as high as 160° C.

Thus, the present invention is comprised of modified tackifier resins for the formulation of monocomponent thermoplastic adhesives with excellent creep resistance, modified resins which result from the reaction of polyisocyanates with tackifier resins, and the free isocyanate level of which is between 1.5 and 20%, preferentially between 5 and 15%. The invention also comprises other conventional components of thermoplastic adhesives such as modified waxes which have been provided with the quality of reactivity with moisture by controlled reaction with polyisocyanates.

DETAILED DESCRIPTION

The modifiable tackifier resins that are useful for the invention belong to the group constituted by phenol-terpenes, styrenes (styrene, α-methylstyrene) modified by phenol, rosins, and their derivatives, notably their polyol esters. All of these substances have —OH groups, as part of alcohol or carboxylic functions, capable of reacting with isocyanates. Any mixture of these resins with polyether polyols and/or polyester polyols can also result in a post-cross-linkable product. French Patents No. 2 313 817 and No. 2 307 836 (Resin and Terpene Derivatives) provide a particularly valuable description of resins of the diphenlic terpene type that are particularly useful for the invention and their disclosure is incorporated herein by reference.

The modifiable waxes that are useful for the invention belong to the groups:
 (i) of polyethylene-glycols,
 (ii) of ethylene/acrylic acid copolymers, and
 (iii) of ethylene/maleic anhydride copolymers.

The polyisocyanates that are employed to create the modified tackifier resins, and the modified waxes, plasticizers, such as castor oil, and polymers in accordance with the invention, are the aliphatic or aromatic polyisocyanates. The diisocyanates, particularly diisocyanate diphenylmethane (MDI), are preferred.

All of these modified components in accordance with the invention, which can be prepared according to a process than can be perfectly controlled and which guarantees their quality, can be employed as components in the manufacture of cross-linkable thermoplastic adhesives. These cross-linkable thermoplastic adhesives, which are also part of the invention, are generally comprised of 5 to 80% of a thermoplastic polymer, from 0 to 60% of waxes and/or paraffins and from 10 to 80% of tackifier resins (these percentages are the limits within which each of the components can be employed, in relation to a final composition the sum of the components of which is, of course, set at 100%). The polymer bases employed are those that are usually selected by the expert in the field of formulations containing a tackifier resin, i.e., bases whose viscosity in the melted state is between 0.1 and 200 Pa.s. The tackifier resins are the modified resins as described above, or mixtures of ordinary and modified resins. In the place of waxes and plasticizers ordinarily used, use can be made of modified waxes and plasticizers of mixtures of these ordinary components with modified components. In all cases, the adhesive's overall content of modified components must be such that the isocyanate level of the formulated adhesive is between circa 1 and 15, including the contribution that can be provided to the formulation by the possible presence of a PPU prepolymer. The formulation and packaging methods for the manufacture of ordinary thermoplastic adhesives, which are well known by the expert in the field, are applied to these components. It is obvious that all precautions must be taken to avoid contact between these reactive components and moisture, especially during their storage and during their use for the manufacture of the adhesives in which they are incorporated.

When using them, the cross-linkable thermoplastic adhesives in accordance with the invention can be treated like conventional thermoplastic adhesives while taking the necessary precautions to keep them away from ambient moisture until they have been definitively applied. Specifically, they can be applied industrially by means of special equipment that was previously developed by companies such as NORDSON and MELTEX for thermoplastic adhesives that are cross-linkable by PPU polymers.

Thus, the invention provides the expert in the field with a new technical means:
 (i) for creating thermoplastic adhesives with better creep performance, on the basis of conventional formulations;
 (ii) for selectively varying their characateristics, and notably (iii) for creating products with very short setting times, based on the very rapid crystallization of the ethylene in EVA and ethylene-acrylates, on the glass transition temperature of styrene ($T_g=90°$ C.) for the case of functionalized thermoplastic rubbers;

(iv) for formulating thermoplastic adhesives with long open times with functionalized thermoplastic rubber bases as well as with the bases cited above in which the PPU prepolymer initially plays the role of a plasticizer;

(v) for improving pliability by means of cross-linkable polymer bases; and (vi) for improving the initial cohesion of the product by means of reducing the amount of PPU prepolymer and compensation for this reduction by means of the cross-linkable tackifier resin.

The well known defects of the cross-linkable thermoplastic adhesives of the prior art have been eliminated from the thermoplastic adhesives in accordance with the invention. For example, they have a much lower sensitivity to overheating than silanated EVA, better setting time, a longer open time and better cohesion than the thermoplastic adhesives constituted of PPU prepolymers and better cohesion than the EVA/PPU/-tackifier resin systems.

Among the valuable and useful applications of the thermoplastic adhesives in accordance with the invention can be cited the manufacture of scrubber-sponges. These objects are usually manufactured by bonding an abrasive pad onto a cellulose sponge block using a thermopolastic adhesive. It is easy to see all of the advantages than can be achieved by employing a thermoplastic adhesive in accordance with the invention which bestows on the objects excellent resistance to very hot water even to the temperatures of the dishwasher into which these objects can accidentally slip. Another valuable application is the manufacture of sterilizable foam mattresses in which can be provided, by means of this invention, thermoplastic adhesives with the long open time required by the spraying operation and the counter-bonding of foam after a certain delay, with the unit being made resistant to sterilization by its spontaneous post-cross-linking. We can also cite the bonding of joints for carpentry required to be exposed to high temperatures., e.g., transport containers or storage room, and the bonding of packaging that must be microwave resistant.

The invention will be further described in connection with the following examples which are set forth for purposes of illustration only.

EXAMPLES

In the following examples, reference is made to open time measurements and to the SAFT test.

Measurement of the open time is performed by depositing on a cardboard support a circa 1.5-wide line of thermoplastic adhesive at circa 170° C. It is allowed to cool to room temperature until there is seen good bonding on a second support of counter-bonded cardboard. The maximum waiting time required to achieve good bonding (ripping of the cardboard) is the open time.

To carry out the SAFT test, bonding is performed on a cardboard "shearing" test specimen, 2.5 cm×2.5 cm. For this, one applies at $\simeq 130°$ two threads of adhesive, circa 1 mm in diameter and circa 2.5 cm apart, at one end of the cardboard strip. A second strip of cardboard is counter-bonded in an overhanging position. The setting time of the products is several seconds (circa 10 seconds). In order to obtain ripping of the cardboard, a force of 0.5 daN in applied in the plane of the unit. In practice, the unit is suspended vertically, a weight of 500g is attached at the end of the test specimen and the unit is subjected to a 5° C. increase in temperature every 30 minutes, starting at 40° C. The SAFT performance is the temperature at which the bond yields.

The immediate creep temperature is the temperature obtained for a bond that has been aged for less than two hours before the test. The creep temperature can also be measured on test specimens that have been allowed to age for several days at room temperature.

The following tackifier resins were employed in the examples below:

(i) Uratack 68520 (DSM) which is an α-methyl styrene resin modified with phenol; its hydroxyl index $I_{OH}=36$; or (ii) resins 8923, 8924, 8941 (DRT), which are phenol-terpene type resins; their hydroxyl indices are 100, 120 and 129, respectively.

An important characaristic of the modified resins in accordance with the invention is their content of free isocyanate. This content is expressed by weight in grams of free NCO per 100 grams of modified resin and it is determined with the standard AFNOR 52132.

EXAMPLE 1

(a) Synthesis of cross-linkable resin R1

In order to obtain the desired reaction and a final % of NCO of 10%, the following mixture was held at 100° C. for 4 hours:

| * Uratack resin 68520 | 185 g |
|---|---|
| * MDI | 100 g |
| * Triethylamine | 0.2% |

(The triethylamine acts as a catalyst of the reaction of —OH with the isocyanate).

(b) Formulation of the thermoplastic adhesive

The adhesive was prepared by intimately mixing the following ingredients at 130° C., and continuing for circa 2 hours.

| EVA 40/55 | 10.5% by weight |
|---|---|
| EVA 45/7.5 | 9.5% |
| Resin R1 | 50% |
| PPU prepolymer(XPU 6778A1) | 30% | in which EVA 40/55 is an ethylene/vinyl acetate copolymer with 40% vinyl acetate; Melt Index=55; in which EVA 45/7.5 is an ethylene/vinyl acetate copolymer with vinyl acetate; Melt Index=7.5; and in which the PPU prepolymer XPU 6778A1 is a prepolymer from CECA S.A., formed from MDI and with an NCO content of 7.

The adhesive formulated in this manner had a final NCO content of 7.1%.

(c) Evaluation of the performance of the thermoplastic adhesive

Using the SAFT test, a rupture temperature of 60° C. was measured on the shearing test specimen 2 hours after application of the adhesive. The result was greater than 160° C. for a shearing test specimen 5 days after application of the adhesive.

EXAMPLE 2

A thermoplastic formulation was prepared under the same conditions as in Example 1, but with the following composition:

| Resin R1 | 40% |
|---|---|
| EVA 33/400 | 35% |
| EVA 28/800 | 25% | in which EVA 33/400 is an ethylene/vinyl acetate copolymer with 33% vinyl acetate; Melt Index=400; in which EVA 28/800 is an ethylene/vinyl acetate copolymer with 28% vinyl acetate; Melt Index=800.

The adhesive formulated in this manner had a final NCO content of 4%. The cross-linking time required for this formulation is long. The immediate SAFT performance (after 2 hours) was 65° C.; the SAFT performance after 15 days of aging in ambient air was 115° C.

EXAMPLE 3

Modification of phenol-terpene based tackifier resins 8923 and 8924 (DRT).

(a) Synthesis of cross-linkable resin R2

In order to obtain the desired reaction, with a final isocyanate content of 7%, a mixture of the following was held at ≈90° C. for circa 4 hours.

| DRT 8923 | 100 g |
|---|---|
| DRT 8924 | 41 g |
| MDI | 80 g |
| DBTL (dibutyl tin dilurate), catalyst | 0.3% |

(b) Formulation of the thermoplastic adhesive

The adhesive was prepared by mixing the following ingredients at ≈130° C. for 2 hours.

| EVA 51/18 | 10% |
|---|---|
| EVA 40/55 | 20% |
| Resin R2 | 20% |
| Kristallex F100 | 30% |
| Prepolymer NM36 | 20% | in which EVA 51/18 is an ethylene/vinyl acetate copolymer with 51% vinyl acetate; Melt Index=18, (Vynathene EY 905 from U.S.I.); in which EVA 40/55 is an EVA copolymer with 40% vinyl acetate; Melt Index= 55; Elvax 40 (du Pont); in which prepolymer NM 36 is a conventional liquid PPU prepolymer from CECA S.A., resulting from the condensation of polyols and MDI; final NCO index 32 7; and in which Kristallex F100 (Hercules) is an α-methyl styrene resin.

The formulated adhesive had a final NCO of 2.8%.

(c) Evaluation of the performance of the thermoplastic adhesive

| Immediate SAFT performance | 55° C. |
|---|---|
| SAFT performance after 2 days | >160° C. |
| Open time | 20 seconds |

EXAMPLE 4

Use is made of a modified tackifier resin of the phenol-terpene type (R3).

(a) Modification of the resin

Resin 8941 (DRT) is condensed with MDI so as to obtain a modified resin (R3) whose final free isocyanate content is 10%.

(b) Formulation of the thermoplastic adhesive

The following were mixed at 130° C. for 1.5 hours:

| EVA 33/400 | 30% |
|---|---|
| EVA 28/800 | 10% |
| Kristallex F100 | 10% |
| Rosin resin ester | 15% |
| Resin R3 | 30% |

(c) Evaluation of the thermoplastic adhesive

| Measured NCO content of the thermopolastic adhesive | 3.15% |
|---|---|
| Viscosity at 140° C. | 16 Pa · s |
| Immediate SAFT performance | 65° C. |
| SAFT performance after two days: | >160° C. |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A monocomponent thermoplastic adhesive composition comprising:
   from 5 to 80% by weight of a thermoplastic polymer,
   from 0 to 60% by weight of a wax and/or paraffin, and
   from 10 to 80% by weight of a tackifier resin,
   wherein the tackifier resin is a modified resin resulting from the reaction of a polyisocyanate with a resin selected from a rosin and its polyol esters, a styrene resin modified by a phenol, or a phenol-terpene, and the isocyanate index of which is between 1.5 and 20%.

2. A monocomponent thermoplastic adhesive composition consisting essentially of:
   from 5 to 80% by weight of a thermoplastic polymer,
   from 0 to 60% by weight of wax and/or paraffin; and
   from 10 to 80% by weight of a tackifier resin,
   wherein the tackifier resin is a totally or partially modified resin resulting from the reaction of a polyisocyanate with a resin selected from a rosin and its polyol esters, a styrene resin modified by a phenol, or a phenol-terpene, and the isocyanate index of the thermoplastic composition is between 1 and 15%.

3. A monocomponent thermoplastic adhesive polymer comprising:
   from 5 to 80% by weight of a thermoplastic polymer,
   from 0 to 60% by weight of a modified wax and/or paraffin; and
   from 10 to 80% by weight of a tackifier resin,
   wherein the mixture of modified wax and/or paraffin and tackifier resin contains a sufficient amount of a modified wax, paraffin and tackifier that the content of isocyanate of said composition is between 1 and 15%, said tackifier resin resulting from the reaction of a polyisocyanate with a tackifier resin selected from a rosin, a rosin derivative, a styrene resin modified by a phenol, or a phenol-terpene resin, characterized in that its content of free isocyanate is between 1.5 and 20%.

4. The composition of claim 3, wherein said tackifier resin results from the reaction of a polyisocyanate with a phenol-terpene type resin of the diphenol-terpene type.

5. The composition of claim 3, wherein said polyisocyanate is diphenylmethane diisocyanate.

6. The composition of claim 3, wherein said modified wax results from the reaction of a polyisocyanate with a wax selected from a polyethylene-glycol wax or an ethylene/acrylic acid copolymer wax.

* * * * *